United States Patent
Mochizuki et al.

(10) Patent No.: US 11,663,393 B2
(45) Date of Patent: *May 30, 2023

(54) COMBINING AND DISPLAYING MULTIPLE DOCUMENT AREAS

(71) Applicant: International Business Machines Corporation, Armonk, NY (US)

(72) Inventors: Tomoka Mochizuki, Tokyo (JP); Tomohiro Shioya, Tokyo (JP); Asuka Unno, Tokyo (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 16/275,392

(22) Filed: Feb. 14, 2019

(65) Prior Publication Data

US 2019/0188245 A1 Jun. 20, 2019

Related U.S. Application Data

(63) Continuation of application No. 15/412,212, filed on Jan. 23, 2017, now Pat. No. 10,241,977, which is a (Continued)

(30) Foreign Application Priority Data

Oct. 21, 2014 (JP) .................. 2014-214429

(51) Int. Cl.
*G06F 40/00* (2020.01)
*G06F 40/106* (2020.01)
(Continued)

(52) U.S. Cl.
CPC ........ *G06F 40/106* (2020.01); *G06F 3/04817* (2013.01); *G06F 3/04842* (2013.01);
(Continued)

(58) Field of Classification Search
CPC .... G06F 40/106; G06F 40/117; G06F 40/166; G06F 3/04842; G06F 3/04817; G06F 3/04845; G06F 40/103; G06F 2203/04803
See application file for complete search history.

(56) References Cited

U.S. PATENT DOCUMENTS

5,408,603 A * 4/1995 Van de Lavoir ........ G06F 9/451
715/965
5,659,791 A 8/1997 Nakajima et al.
(Continued)

FOREIGN PATENT DOCUMENTS

JP 05210477 A 8/1993
JP 08509311 A 10/1996
(Continued)

OTHER PUBLICATIONS

ComputerHope, "Window", 3 pages, Jun. 18, 2014 https://web.archive.org/web/20140618223442/http://www.computerhope.com/jargon/w/window.htm.*

(Continued)

*Primary Examiner* — Cesar B Paula
*Assistant Examiner* — David Faber
(74) *Attorney, Agent, or Firm* — Scott S. Dobson

(57) ABSTRACT

A method includes storing, in response to marking by a user of an area of a displayed document, information on the marked area; displaying an icon representing the marked area; conducting the storing operation and the displaying operation for a different area; and creating, in response to an operation by the user for arranging two or more icons to be in contact with each other, a joined icon by joining the icons together; and combining marked areas represented by the two or more respective icons, according to a state of contact. A corresponding computer program product and computer system are also disclosed herein.

20 Claims, 18 Drawing Sheets

Related U.S. Application Data continuation of application No. 14/824,367, filed on Aug. 12, 2015, now Pat. No. 9,632,993.

(51) Int. Cl.
  *G06F 3/04842* (2022.01)
  *G06F 3/04817* (2022.01)
  *G06F 3/04845* (2022.01)
  *G06F 40/117* (2020.01)
  *G06F 40/166* (2020.01)
  *G06F 40/103* (2020.01)

(52) U.S. Cl.
  CPC ........ *G06F 3/04845* (2013.01); *G06F 40/117* (2020.01); *G06F 40/166* (2020.01); *G06F 40/103* (2020.01); *G06F 2203/04803* (2013.01)

(56) References Cited

U.S. PATENT DOCUMENTS

| | | | | |
|---|---|---|---|---|
| 5,801,699 A * | 9/1998 | Hocker | ............... | G06F 3/04817 715/837 |
| 6,031,532 A * | 2/2000 | Gourdol | ................ | G06T 11/60 715/837 |
| 6,544,294 B1 * | 4/2003 | Greenfield | ............. | G06F 16/35 |
| 6,803,930 B1 | 10/2004 | Simonson | | |
| 7,467,351 B1 * | 12/2008 | Spells | ................... | G06F 40/103 715/243 |
| 7,559,034 B1 * | 7/2009 | Paperny | ............. | G06F 9/44526 715/803 |
| 7,689,928 B1 * | 3/2010 | Gilra | .................. | G06F 3/04855 715/786 |
| 8,392,849 B2 * | 3/2013 | Jung | ..................... | G06F 3/0486 715/810 |
| 9,632,993 B2 | 4/2017 | Mochizuki et al. | | |
| 2002/0133628 A1 * | 9/2002 | Asplund | ............ | G06F 16/9558 707/E17.013 |
| 2005/0010865 A1 * | 1/2005 | Kuppusamy | ............ | G06F 16/94 715/205 |
| 2005/0289478 A1 * | 12/2005 | Landman | ............... | G06F 3/0481 715/769 |
| 2006/0242558 A1 * | 10/2006 | Racovolis | ............ | G06F 40/169 715/205 |
| 2007/0100937 A1 * | 5/2007 | Burtner | ................. | G06Q 10/10 709/204 |
| 2008/0158261 A1 * | 7/2008 | Gould | ................ | G11B 27/105 345/157 |
| 2008/0279475 A1 | 11/2008 | Lee et al. | | |
| 2009/0019385 A1 * | 1/2009 | Khatib | ................ | G06F 3/04817 715/765 |
| 2009/0164889 A1 * | 6/2009 | Piersol | ................... | G06F 40/166 715/255 |
| 2009/0241183 A1 * | 9/2009 | Boss | ..................... | G06F 40/131 715/255 |
| 2010/0058182 A1 * | 3/2010 | Jung | ................... | G06F 3/04817 715/702 |
| 2010/0138763 A1 * | 6/2010 | Kim | .................... | G06F 3/04842 715/810 |
| 2011/0035691 A1 * | 2/2011 | Kim | ..................... | G06F 3/0486 715/765 |
| 2013/0036306 A1 * | 2/2013 | Gnech | .................... | G06F 21/64 713/168 |
| 2013/0191711 A1 | 7/2013 | Tashman et al. | | |
| 2013/0191720 A1 * | 7/2013 | Simons | ................ | G06F 3/0481 715/234 |
| 2014/0229891 A1 * | 8/2014 | O'Byrne | ................. | G06F 9/451 715/790 |
| 2014/0237421 A1 * | 8/2014 | Kuhne | .................. | G06F 40/103 715/800 |
| 2015/0346989 A1 * | 12/2015 | Lee | ..................... | G06F 3/04847 715/771 |
| 2016/0092083 A1 * | 3/2016 | Korkus | ............... | G06F 3/04817 715/765 |
| 2017/0132179 A1 | 5/2017 | Mochizuki et al. | | |
| 2018/0039604 A1 | 2/2018 | Mochizuki et al. | | |

FOREIGN PATENT DOCUMENTS

| | | |
|---|---|---|
| JP | 09212330 A | 8/1997 |
| JP | 10021040 A | 1/1998 |
| JP | 10143347 A | 5/1998 |
| JP | 10260784 A | 9/1998 |
| JP | 3258250 B2 | 2/2002 |
| JP | 3318840 B2 | 8/2002 |
| JP | 2007213527 A | 8/2007 |
| JP | 4140918 B2 | 8/2008 |
| JP | 2008299689 A | 12/2008 |
| JP | 4255511 B2 | 4/2009 |
| JP | 2012508929 A | 4/2012 |

OTHER PUBLICATIONS

Mochizuki et al., "Method, Device, and Program for Combining and Displaying Multiple Areas", Japan Patent Application No. 2014-214429 (English Translation), filed on Oct. 21, 2014, 45 pages.

* cited by examiner

US 11,663,393 B2

COMBINING AND DISPLAYING MULTIPLE DOCUMENT AREAS

BACKGROUND OF THE INVENTION

The present invention relates generally to a combined-area display method, and more specifically, to a method, a device, and a computer program for combining and displaying multiple areas of a document.

In recent years, there have been increased opportunities for browsing a document on a device having a small display area, such as a smartphone, or a large display area, such as a multi-screen device. Some users desire to combine and browse multiple user-desired areas in such an environment.

SUMMARY

A method includes storing, in response to marking by a user of an area in the document, information on the marked area; displaying an icon representing the marked area; conducting the storing operation and the displaying operation for a different area; and creating, in response to an operation by the user for arranging two or more icons to be in contact with each other, a joined icon by joining the icons together; and combining marked areas represented by the two or more respective icons, according to a state of contact. A corresponding computer program product and computer system are also disclosed herein.

DETAILED DESCRIPTION

A method, computer program product, computer system, and an apparatus for displaying multiple combined areas in a window, which is a display area, according to various embodiments of the present invention are specifically described below with reference to the drawings. The following embodiments are not intended to limit the invention described in the Scope of claims, and it is presumed that not all the combinations of the characteristic features described in the various embodiments are essential for solutions.

In addition, the present invention can be implemented in a variety of different modes and therefore should not be construed as being limited to the described embodiments.

The present invention may be implemented entirely as hardware or as software that executes on hardware. For example, as apparent to those skilled in the art, the present invention may be partially implemented as a computer-executable program. Hence, the present invention can be implemented as a hardware embodiment, a combined software and hardware embodiment, in addition to a computer-implemented method embodiment. The computer program can be stored on any computer-readable recording medium such as a hard disk, a DVD, a CD, an optical storage device, or a magnetic storage device.

Various embodiments of the present invention will be described below in detail with reference to the drawings. These embodiments provide a combined-area display method. A description is given below by taking, as an example, an operation using a pointing device or the like on a display of, for example, a personal computer. However, the same applies to a case of using a finger on a touchscreen of, for example, a smartphone. Note that such an operation by a finger is rather simple to perform when joining or separating icons.

Figure 17:
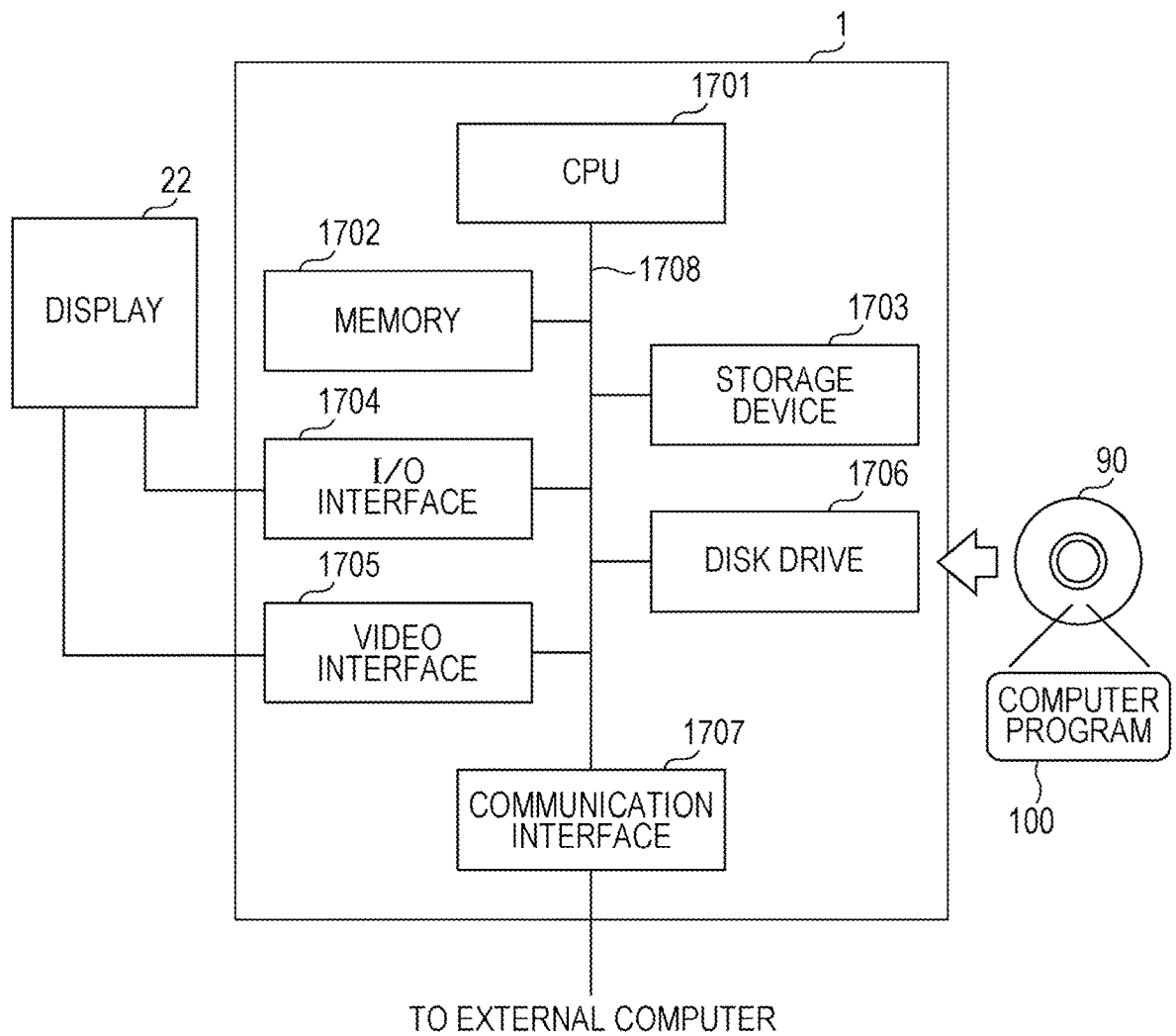
FIG. 17 is a block diagram illustrating an example of a hardware configuration of the information processor of the present invention.

FIG. 17 is a block diagram illustrating a configuration of an information processor according to one embodiment of the present invention. An information processor 1 according to this embodiment of the present invention includes at least a CPU (central processing unit) 1701, a memory 1702, a storage device 1703, an I/O interface 1704, a video interface 1705, a disk drive 1706, a communication interface 1707, and an internal bus 1708 that connects the above-described hardware components to each other.

The CPU 1701 is connected to hardware components as the above-described ones of the information processor 1 via the internal bus 1708. The CPU 1701 controls the operation of each of the hardware components and executes various software functions according to a computer program 100 stored on the storage device 1703. A load module is loaded into the memory 1702 when the computer program 100 is executed, and temporary data generated during the execution of the computer program 100, for example, is stored in the memory 1702.

The storage device 1703 is a built-in, fixed-type storage device that includes a ROM. The computer program 100 stored on the storage device 1703 is downloaded from a portable recording medium 90, such as a DVD or a CD-ROM, on which information such as programs and data is stored, by the portable disk drive 1706 and is loaded from the storage device 1703 to the memory 1702 at the time of execution. Alternatively, the computer program 100 may be downloaded from an external computer connected via the communication interface 1707.

The communication interface 1707 is connected to the internal bus 1708 and is capable of transmitting and receiving data to and from an external computer and the like by having a connection to an external network such as the Internet, a LAN, or a WAN.

The I/O interface 1704 receives data output by an external device. For example, when a display 22 is equipped with a touchscreen, signals generated using the touchscreen are received via the I/O interface 1704. The video interface 1705 is connected to the display 22. A window 110 to be described in an example is displayed on the display 22.

Figure 1:
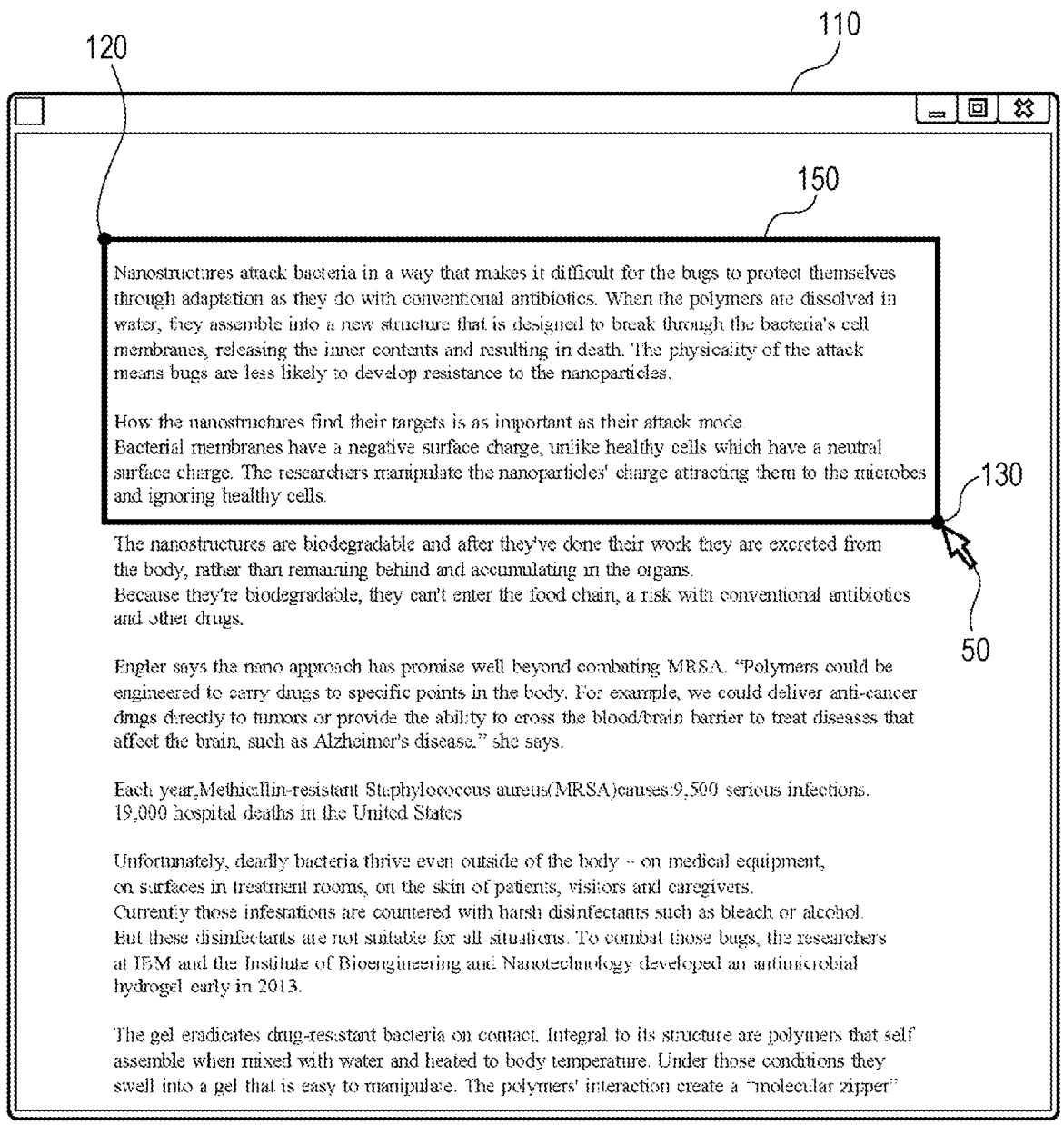
FIG. 1 is a user interface diagram depicting an example in which a document is displayed in a display area displayed on a display.

FIG. 1 is a user interface diagram depicting an example of displaying a document in the window 110 displayed on the display 22 of a computer. The window 110 is generated and displayed by a general application such as a document editor, an image editor, or a browser. As is widely known, the window 110 is resizable. A description is given below assuming that the window 110 is displayed full-screen on the display 22. However, it should be noted that this embodiment can be implemented without departing from the essence of the present invention even when the window 110 is resized and displayed on a certain part of the display 22.

In FIG. 1, a user specifies an area 150, which the user desires to refer to later, in the document displayed in the window 110. In a method employed to specify an area, an area is specified by selecting a start point 120 and an end point 130 by using a pointer 50 of a pointing device, for example. When the area 150 is specified, content information on the area 150 is stored in the memory 1702 or the storage device 1703 in order to be referred to later.

Figure 2:
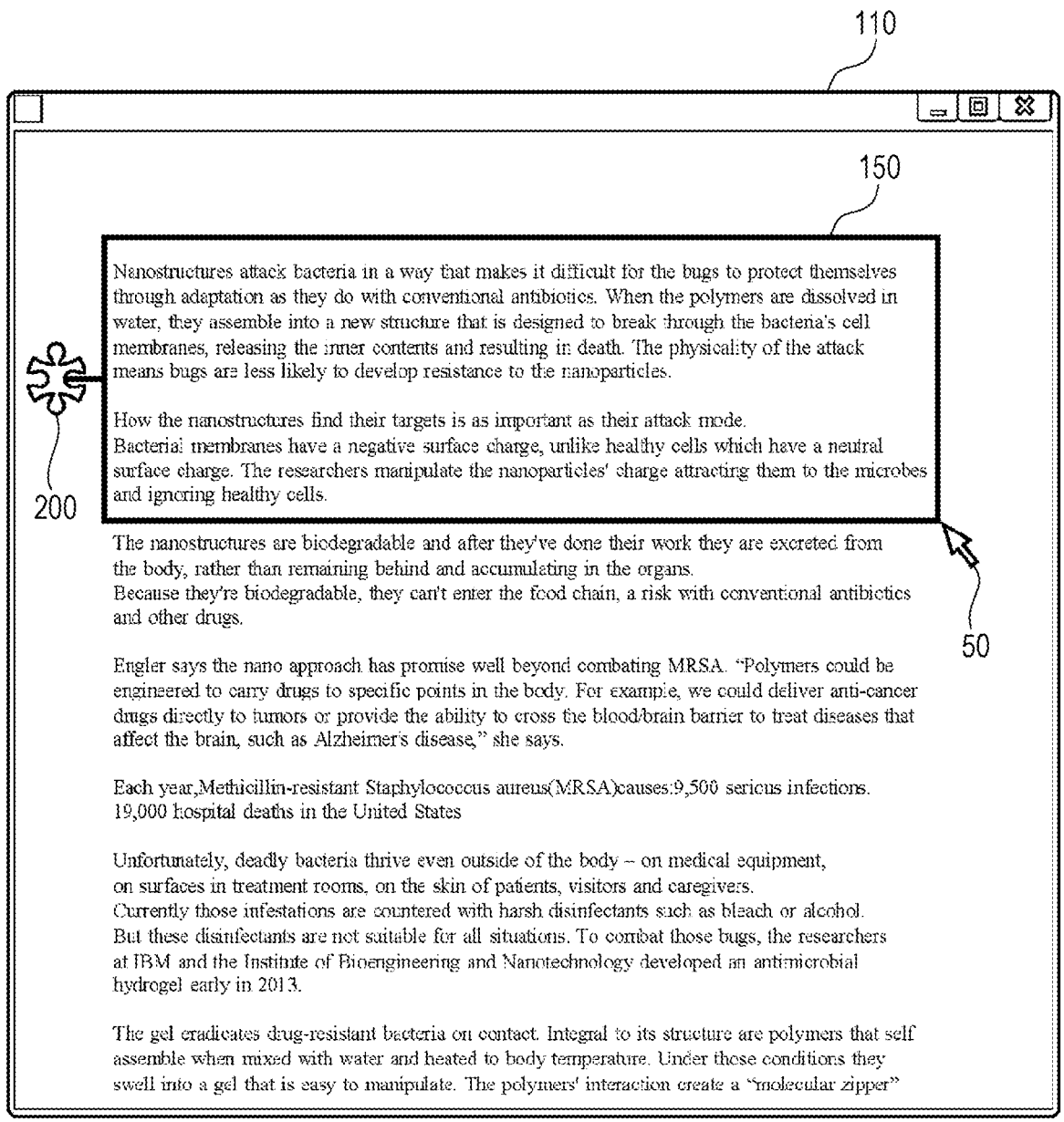
FIG. 2 is an user interface diagram illustrating area selection and an icon of the present invention.

FIG. 2 is an user interface diagram illustrating an icon 200, which is a distinctive feature of the present invention. Upon storing the content of the area 150, the icon 200, which represents the area 150, is generated and displayed. The icon 200 may be displayed at a position such as that in FIG. 2 or a position over the content of the selected area.

The icon 200 may be a predetermined icon, or the user may choose the shape of the icon 200. Preferably, the shape of the icon 200 is determined according to the content of the area 150. For example, when the content of the area 150 includes a text document, an icon representing a book may be used; when the content includes an image, an icon representing a photo may be used; and when the content includes an object, an icon representing a jewel may be used.

The icon 200 in FIG. 2 has a shape of a puzzle piece, which is used in a jigsaw puzzle and is interlockable. The puzzle-piece shape is used here in order to facilitate the understanding of the joining of icons to be described later. As described above, the icon 200 is generated and displayed as an object representing the area 150.

Figure 3:
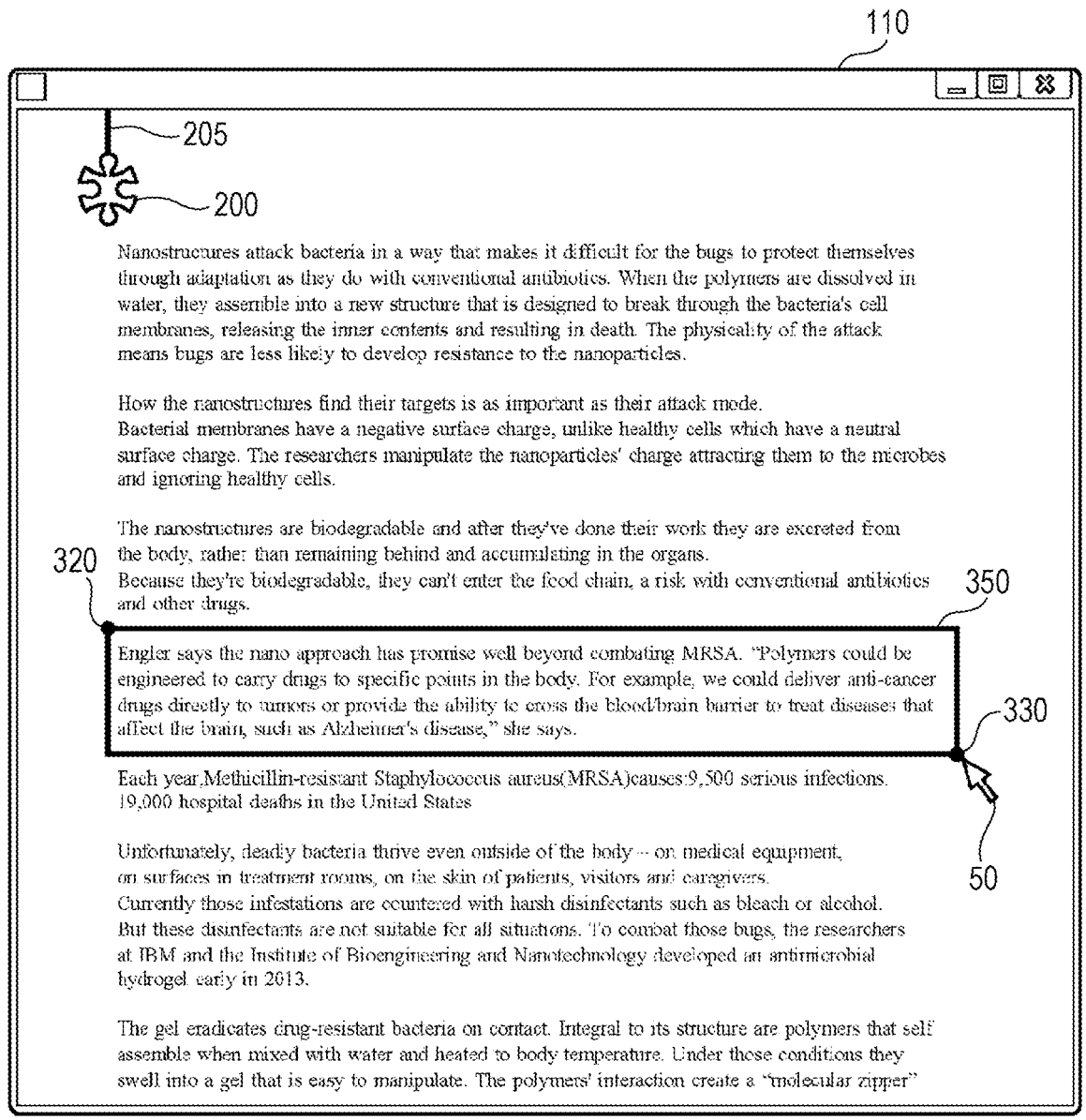
FIG. 3 is a user interface diagram depicting an example of selecting an area in the display area of the display.

FIG. 3 is a user interface diagram illustrating a state in which, after generation of the icon 200, the user further specifies an area 350, which the user desires to refer to later, in the document displayed in the window 110 after scrolling the document in the window 110. The area 350 is specified by selecting a start point 320 and an end point 330 by using the pointer 50. When the area 350 has been specified, the content information on the area 350 is stored in the memory 1702 or the storage device 1703 in order to be referred to later.

In FIG. 3, look at the icon 200. Although the area 150 is not presented in the window 110 as a result of scrolling the document, the icon 200 is displayed in such a manner as to be connected to the upper side of the window 110 via a connecting line 205.

Figure 4:
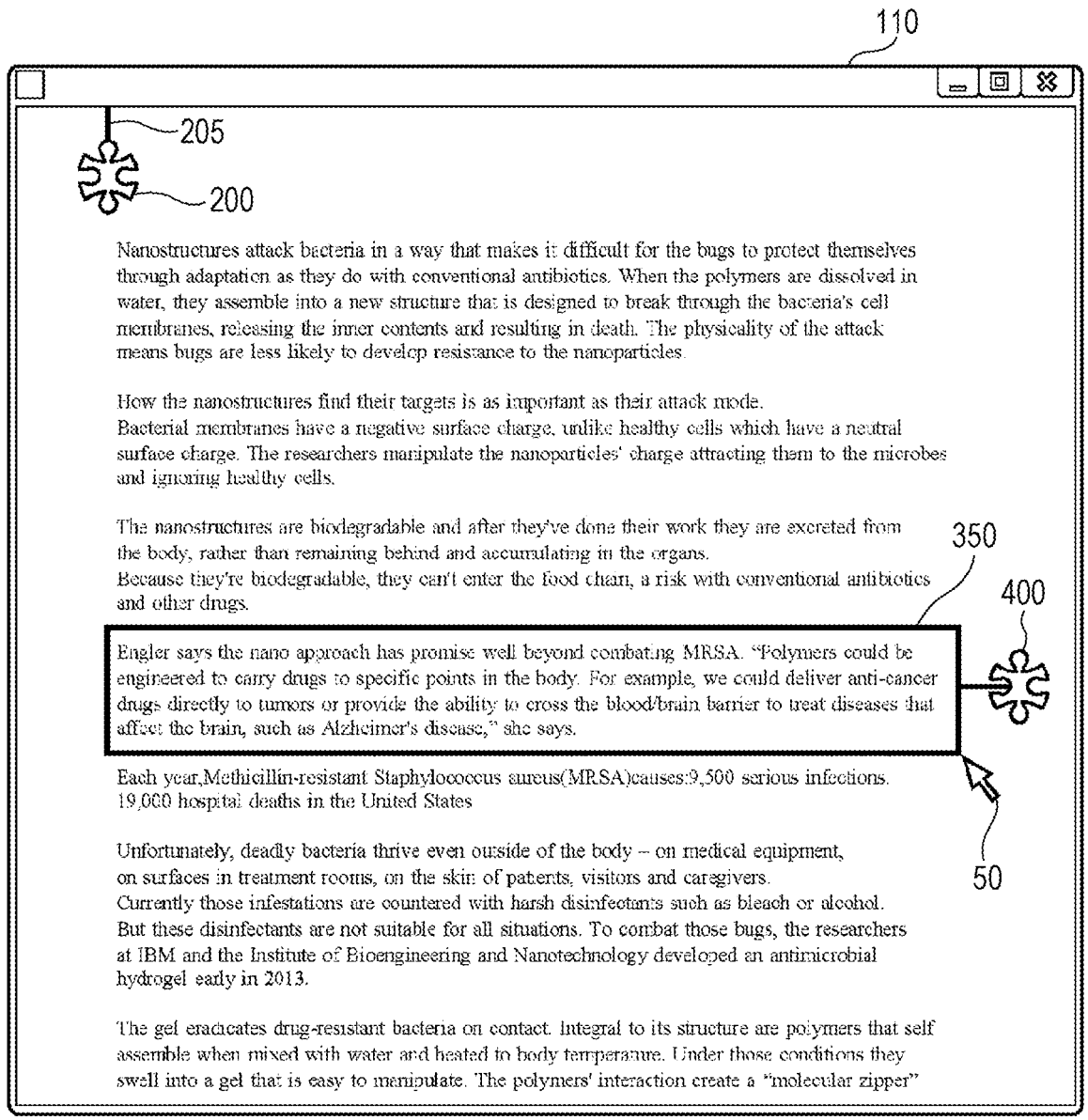
FIG. 4 is a user interface diagram illustrating area selection and an icon of the present invention.

FIG. 4 is an user interface diagram illustrating an icon 400. Upon storing the content of the area 350, the icon 400, which represents the area 350, is generated and displayed.

Figure 5:
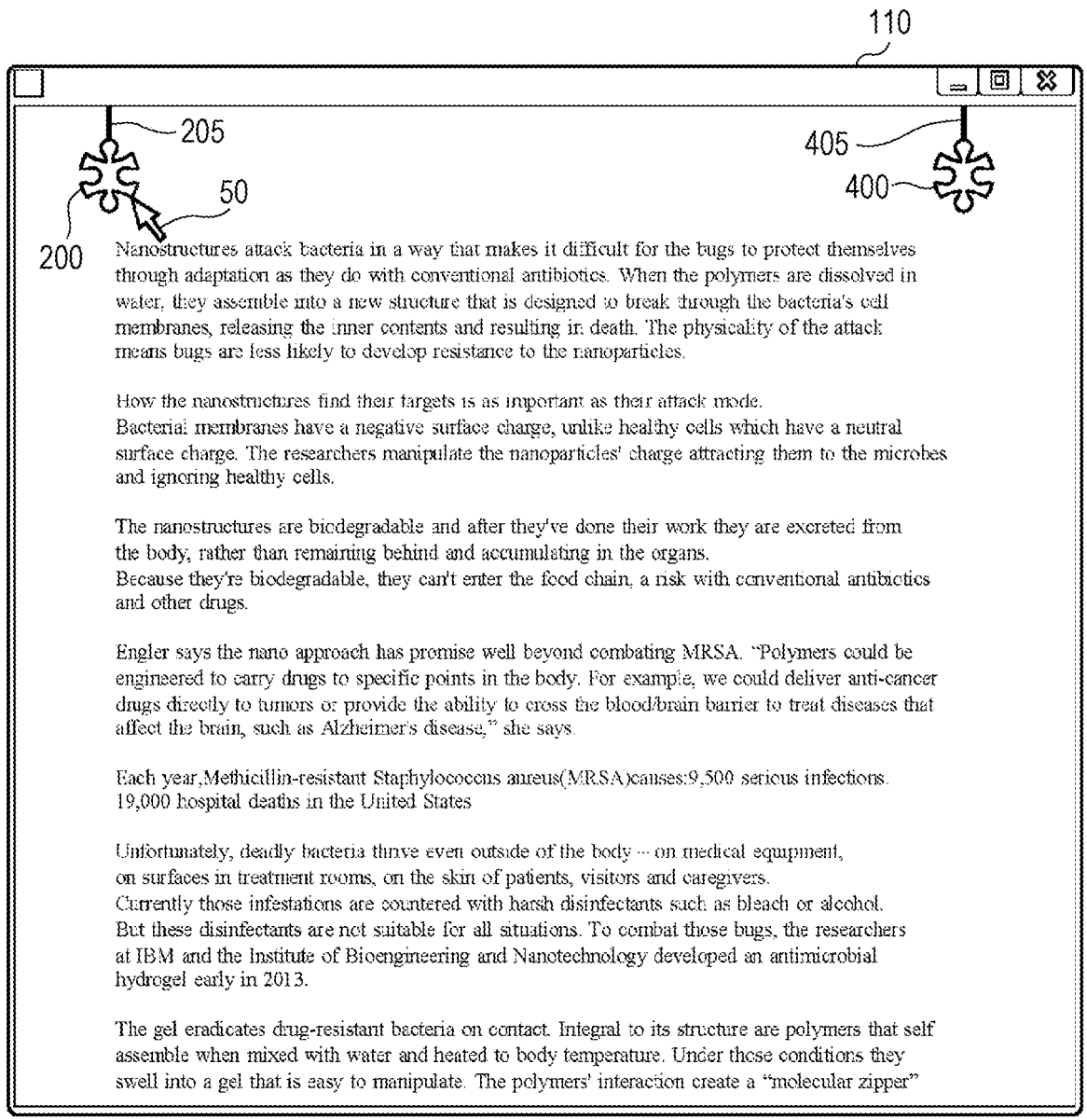
FIG. 5 is a user interface diagram depicting an example of a case of scrolling a document displayed in the display area.

FIG. 5 is a user interface diagram of an example of a screen in the case of further scrolling the document. In this example, although the area 150 and the area 350 are not presented in the window 110, the icon 200 and the icon 400, which respectively represent the area 150 and the area 350, are displayed in such a manner as to be connected to the upper side of the window 110 respectively using the connecting line 205 and a connecting line 405. Such a connecting line is not an essential element but has the effect of indicating to the user that the selected area that is not currently displayed is located before the currently displayed part of the document.

In the case of scrolling in the opposite direction, each icon is displayed in such a manner as to be connected to the lower side of the window 110. Preferably, the position at which a connecting line and a side are connected to each other corresponds to the position on the horizontal axis (x coordinate) at which the corresponding icon is generated.

A description is given above of an example of displaying icons in the case of vertical scrolling. Note that, in the case of horizontal scrolling, each icon is displayed in such a manner as to be connected to the left side or the right side of the window 110.

A description is given of the combining of icons, which is a particularly distinctive feature of the present invention, with reference to FIGS. 6 to 11.

Figure 6:
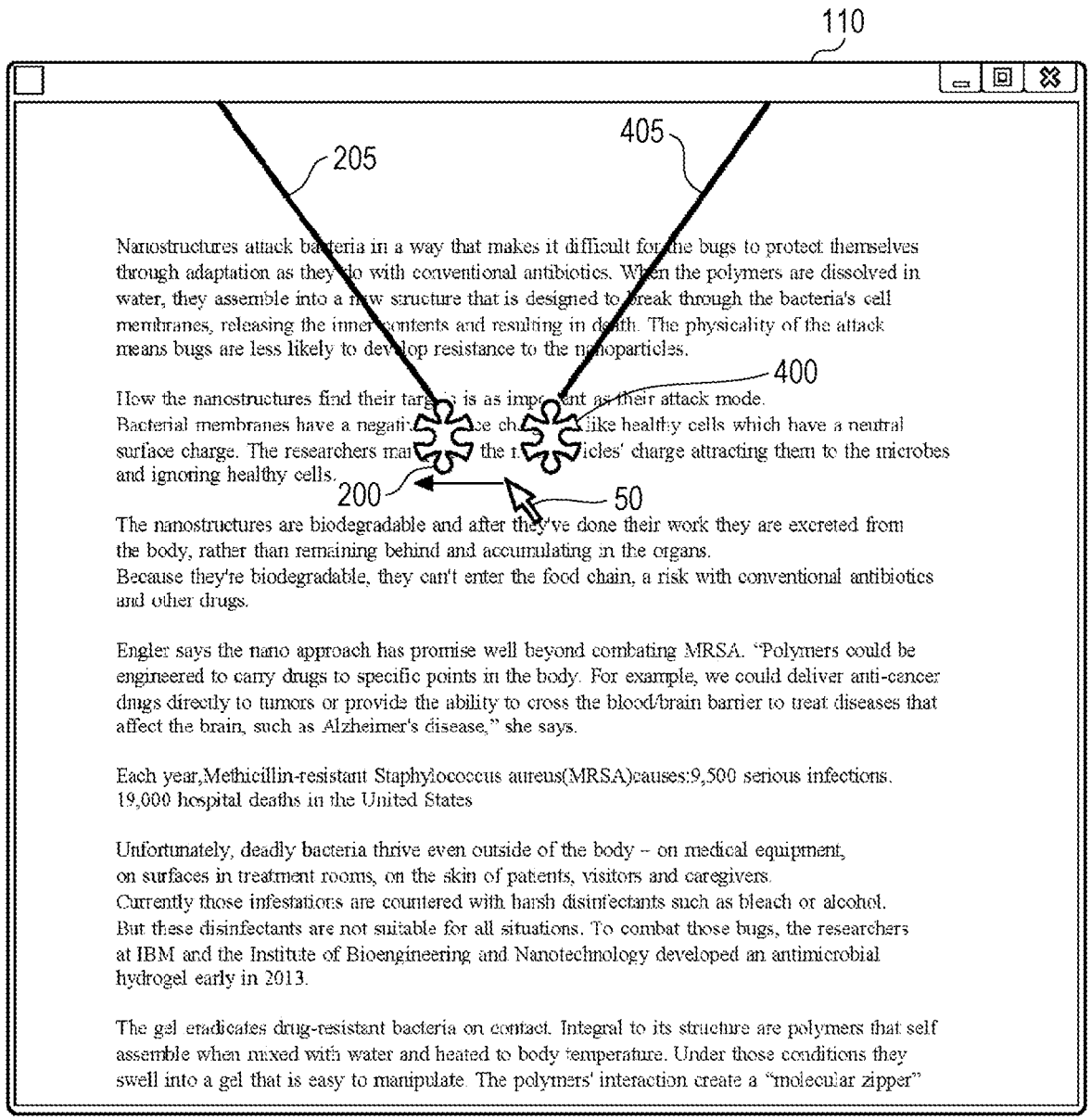
FIG. 6 is a user interface diagram illustrating an operation for arranging icons to be close to each other.

First, FIG. 6 is a user interface diagram illustrating an operation for arranging the icon 200 and the icon 400 to be close to each other. After the icon 200 is dragged to a certain position (around the center of the document in FIG. 6) by using the pointer 50, the icon 400 is arranged closer to the icon 200 in the direction from the right of the icon 200. Preferably, during this operation, each of the connecting line 205 and the connecting line 405 is displayed in such a manner as to expand or contract together with the corresponding icon in order to explicitly indicate that the icon is being dragged.

The shape of the joining icon or the joined icon may be changed so that icons can be interlocked with each other. Alternatively, an auxiliary (e.g., an arrow or a character) may be displayed near an icon in order to indicate each possible direction for joining. In addition, an expected joining position may be displayed. In response to the horizontal contact between the icon 200 and the icon 400, a joined icon is generated.

Figure 7:
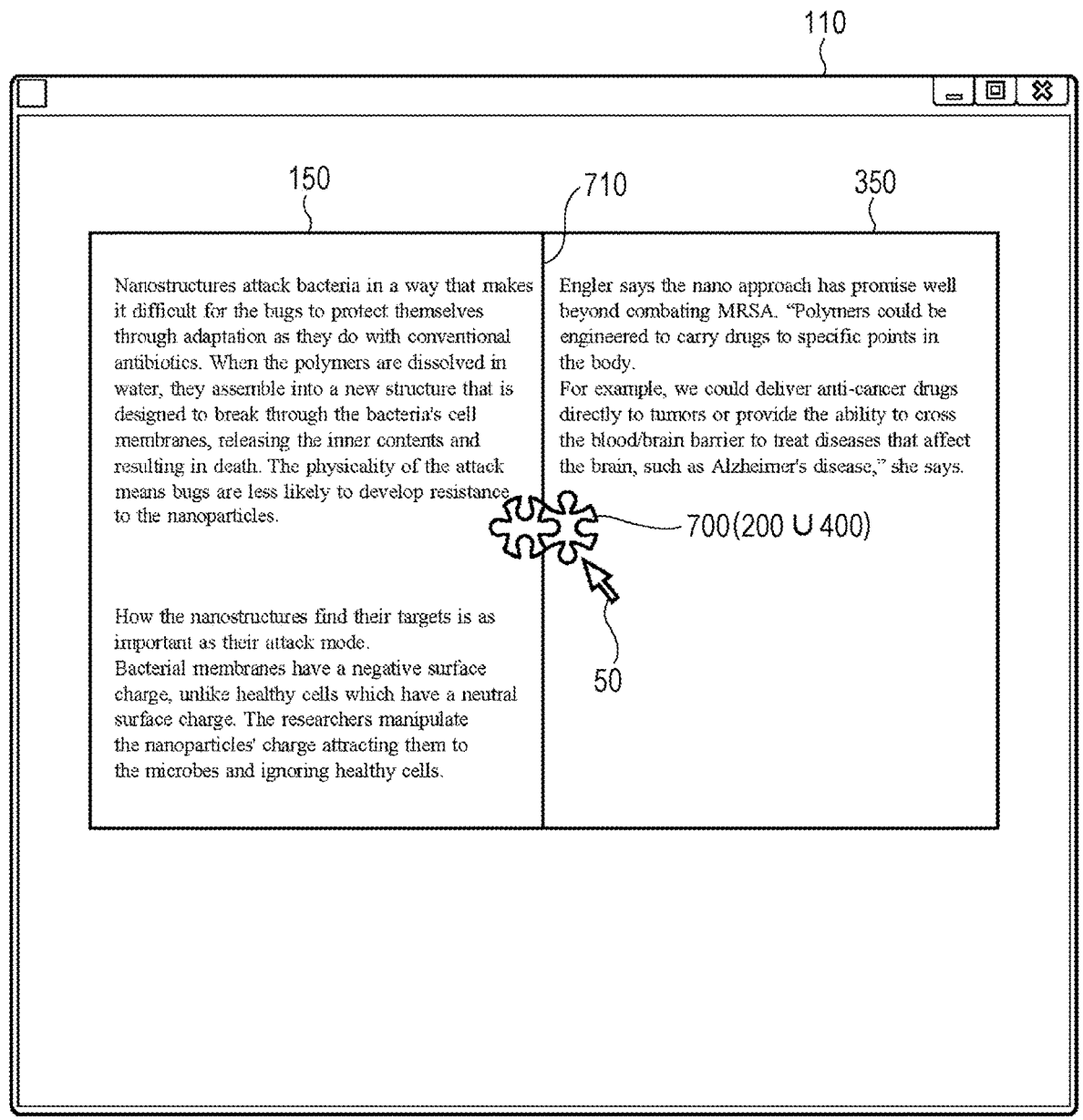
FIG. 7 is a user interface diagram illustrating generation of a joined icon.

FIG. 7 is a user interface diagram illustrating generation of a joined icon 700 in response to horizontal contact between the icons 200 and 400. The icon 700 is a joined icon formed by horizontally joining icons together so that the puzzle pieces interlock with each other. At the same time, the area 150 and the area 350 respectively represented by the icons 200 and 400 are displayed in a horizontally combined manner having a joining line 710 therebetween. In this state, the joining positions of the areas may be determined according to the joining positions of the icons.

200∪400 provided in parentheses for the icon 700 indicates an icon generated by joining the icon 200 and the icon 400 together.

Preferably, the joined icon is formed in such a way that the shape of an icon is changed before and after joining. As can be seen by carefully viewing the icon 200 in FIG. 6 and FIG.

7, the shape of the icon 200 is different before and after joining. Changing the shape of the icon as described above can produce a state in which the icons are firmly joined to each other.

The joined icon may be hidden by a certain operation or after a certain period of time. Alternatively, the joined icon may be displayed at a reduced size. In the case where the joined icon is hidden, the joined icon may be displayed again by a certain operation. Alternatively, the icon may be moved to a position at which the icon does not overlap the content or may be moved to a desired position. When the operation for separating the joined icon by using the pointer 50 is performed or when a predetermined termination keystroke combination (e.g., Ctrl+Alt+BackSpace) is pressed in this state, the joined icon is split, and the display is reverted to the state in FIG. 6.

Figure 8:
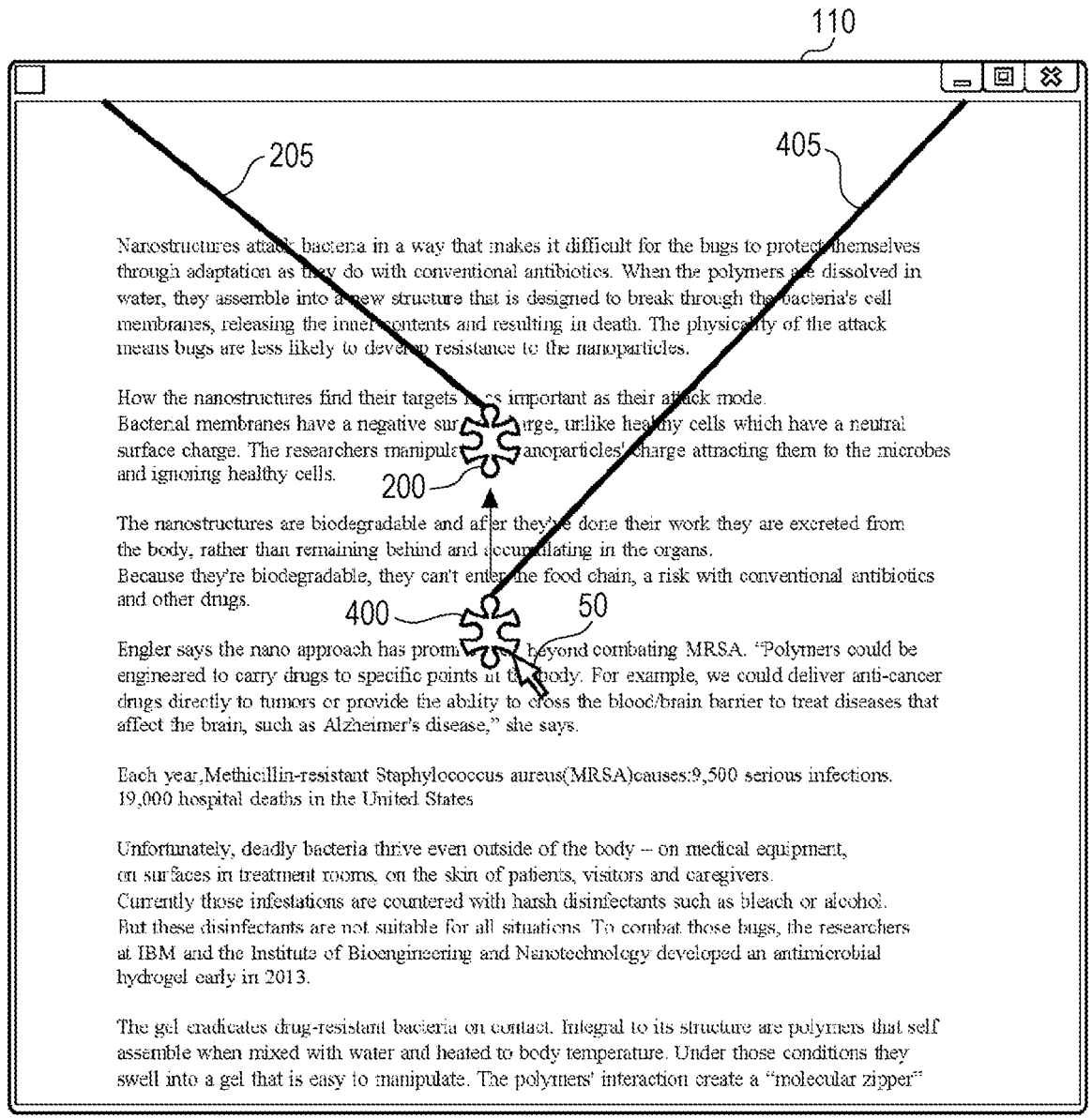
FIG. 8 is a user interface diagram illustrating an operation for arranging icons to be close to each other.

FIG. 8 is a user interface diagram illustrating an operation for vertically joining the icon 200 and the icon 400. After the icon 200 is dragged to a certain position by using the pointer 50, the icon 400 is arranged closer to the icon 200 in the direction from the bottom side of the icon 200. Preferably, during this operation, each of the joining line 205 and the joining line 405 is displayed in such a manner as to expand or contract together with the corresponding icon in order to explicitly indicate that the icon is being dragged. In response to the vertical contact of the icon 200 and the icon 400 with each other, a joined icon indicating a vertical join is generated.

A predetermined joined icon may be used as a joined icon according to the types of the icons that are joined together and variations in joining direction, or the shape of a joined icon may be calculated at the time of contact on the basis of the shapes of the icons that are joined together and the joining direction in order to generate a joined icon accordingly.

Figure 9:
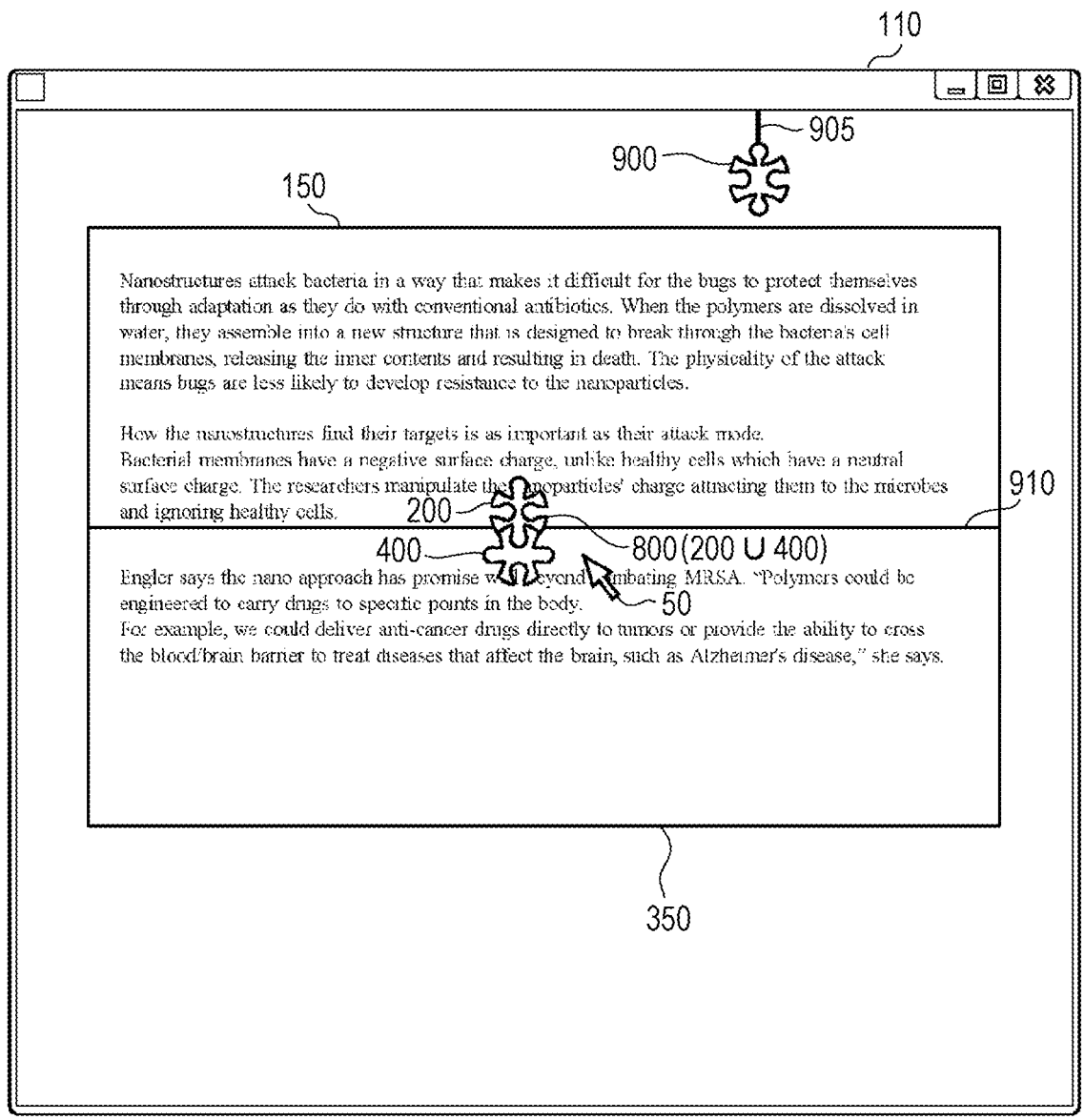
FIG. 9 is a user interface diagram illustrating generation of a joined icon.

FIG. 9 is a user interface diagram illustrating that a joined icon 800 is generated in response to vertical contact of the icons with each other. The icon 800 is a joined icon formed by horizontally joining the icons together so that the puzzle pieces interlock with each other. At the same time, the area 150 and the area 350 respectively represented by the icons 200 and 400 are displayed in a vertically joined manner having a joining line 910 therebetween.

200∪400 provided in parentheses for the icon 800 indicates an icon generated by joining the icon 200 and the icon 400 with each other. The joined icon may be formed in such a way that the shape of an icon is changed before and after the icon is joined to another icon. As can be seen by carefully viewing the icon 400 in FIG. 8 and FIG. 9, the shape of the icon 400 is different before and after the icon 400 is joined.

Figure 10:
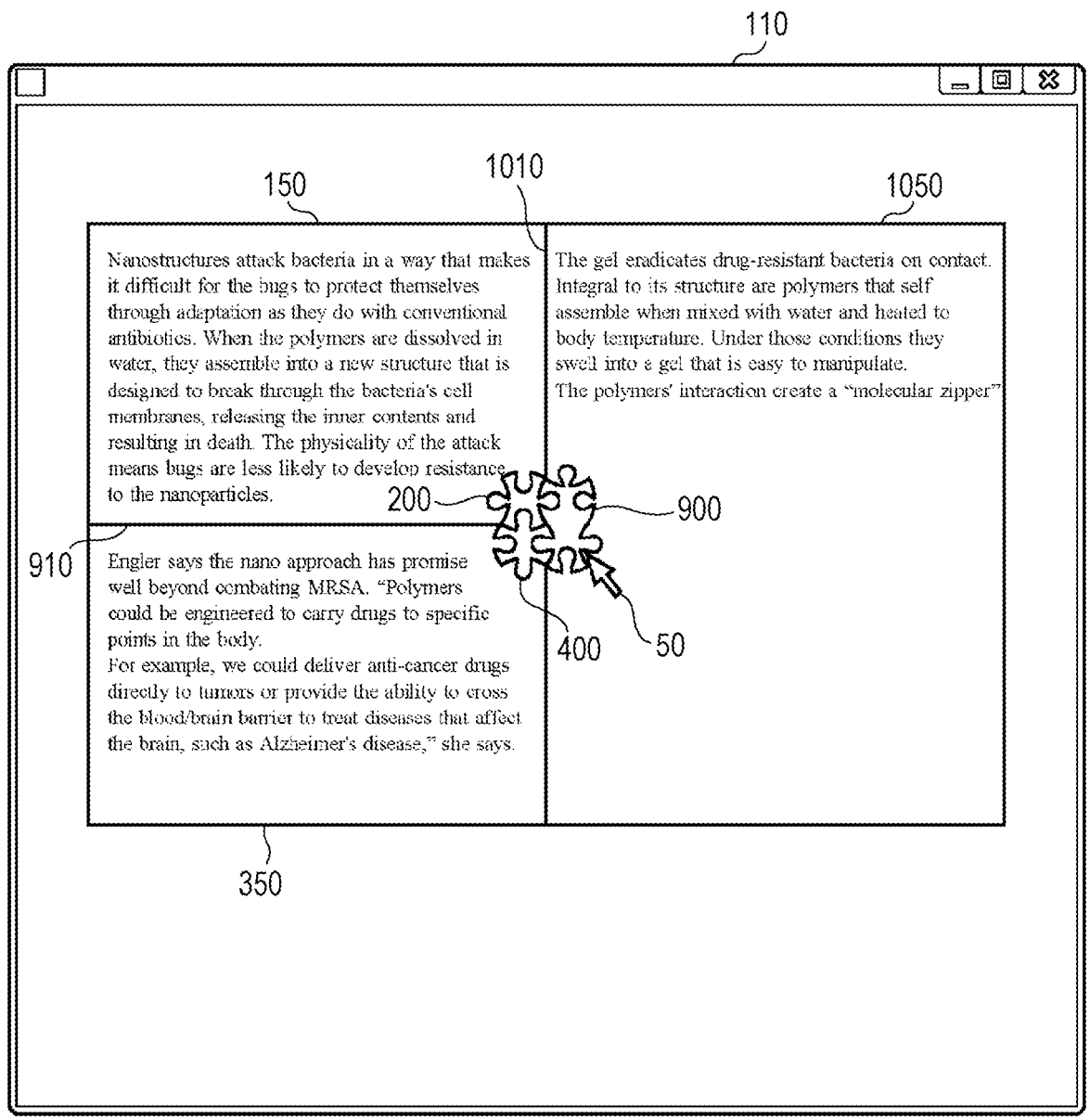
FIG. 10 is a user interface diagram illustrating generation of a joined icon.

In FIG. 9, it is assumed that an icon 900 representing a different selected area is connected to the upper side via the connecting line 905. FIG. 10 illustrates a state where the icon 900 is horizontally brought into contact with the joined icon 800.

FIG. 10 is a user interface diagram illustrating a joined icon formed by joining three icons. The joined icon has a shape obtained by attaching the icon 900 to the right side of the icon 800 so as to indicate that the icon 900 has been horizontally brought into contact with the icon 800. At the same time, the area 150 and the area 350 represented by the icons 200 and 400 are displayed in a vertically combined manner having the joining line 910 therebetween, and these areas and the area represented by the icon 900 are horizontally joined together having a joining line 1010 therebetween.

Figure 11:
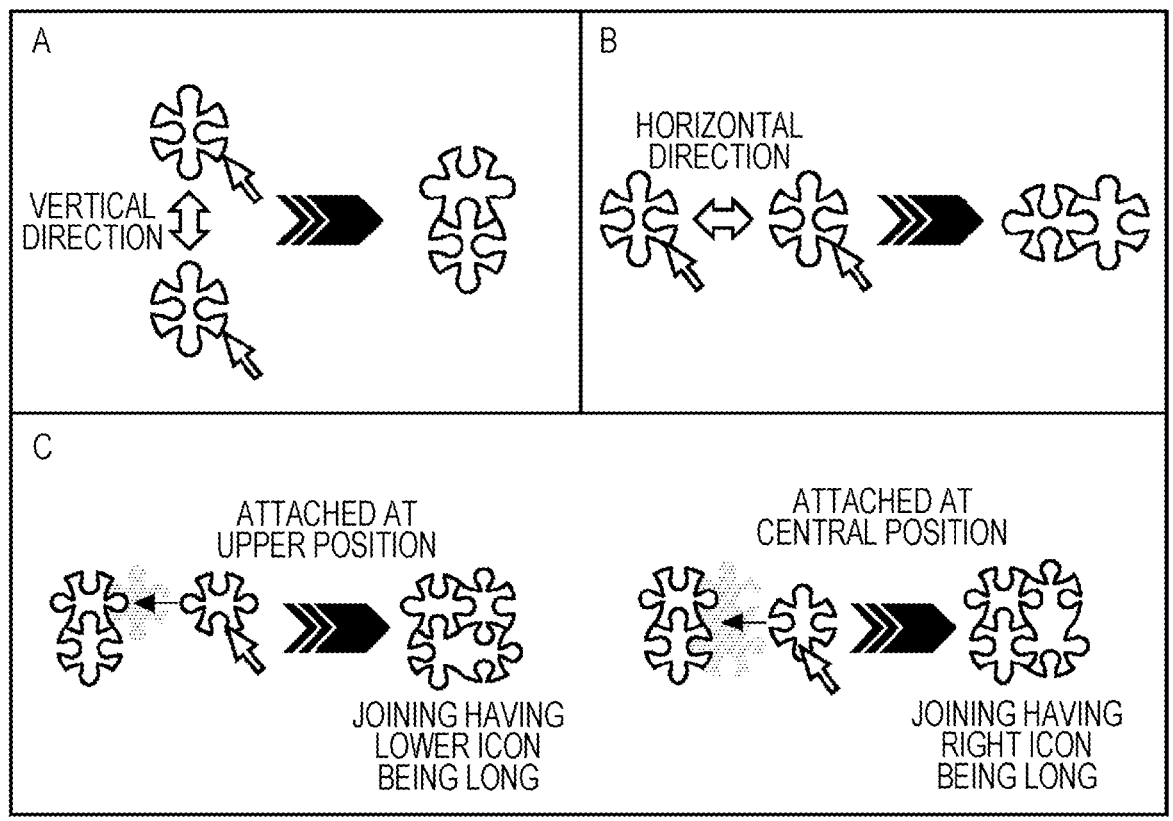
FIG. 11 a user interface diagram that illustrates examples of generation of a joined icon according to joining direction.

FIG. 11 is a user interface diagram that provides examples of a joined icon generated according to the joining direction of icons. Part A of FIG. 11 illustrates an example of generation of a joined icon in the case of vertical joining. Part B of FIG. 11 illustrates an example of generation of a joined icon in the case of horizontal joining.

Part C of FIG. 11 illustrates two examples of generation of a joined icon in the case where a different icon is horizontally brought into contact with a joined icon generated by joining two icons. The example on the left illustrates a case where an icon is horizontally brought into contact with a joined icon at an upper position of the joined icon. The example on the right illustrates a case where an icon is brought into contact with a joined icon at a central position of the side of the joined icon.

In the examples of Part C of FIG. 11, the number of icons after the icons are joined together is an odd number. In such a case, the position of the icon that has been arranged to be in contact with the other icons may indicate the content of the icon to be displayed long.

While an icon can be further added to a joined icon as illustrated in Part C of FIG. 11, an intended icon can be deleted from a joined icon. For deletion, an icon desired to be separated is selected by, for example, using the pointer 50 with reference to the property of the joined icon. Alternatively, joining of the icons is terminated by an operation for arranging, to a certain distance, the icon that has been arranged to be in contact with the other icon. Thereafter, the areas represented by the remaining icons are rejoined so as to correspond to the joined icon after deletion.

Figure 12:
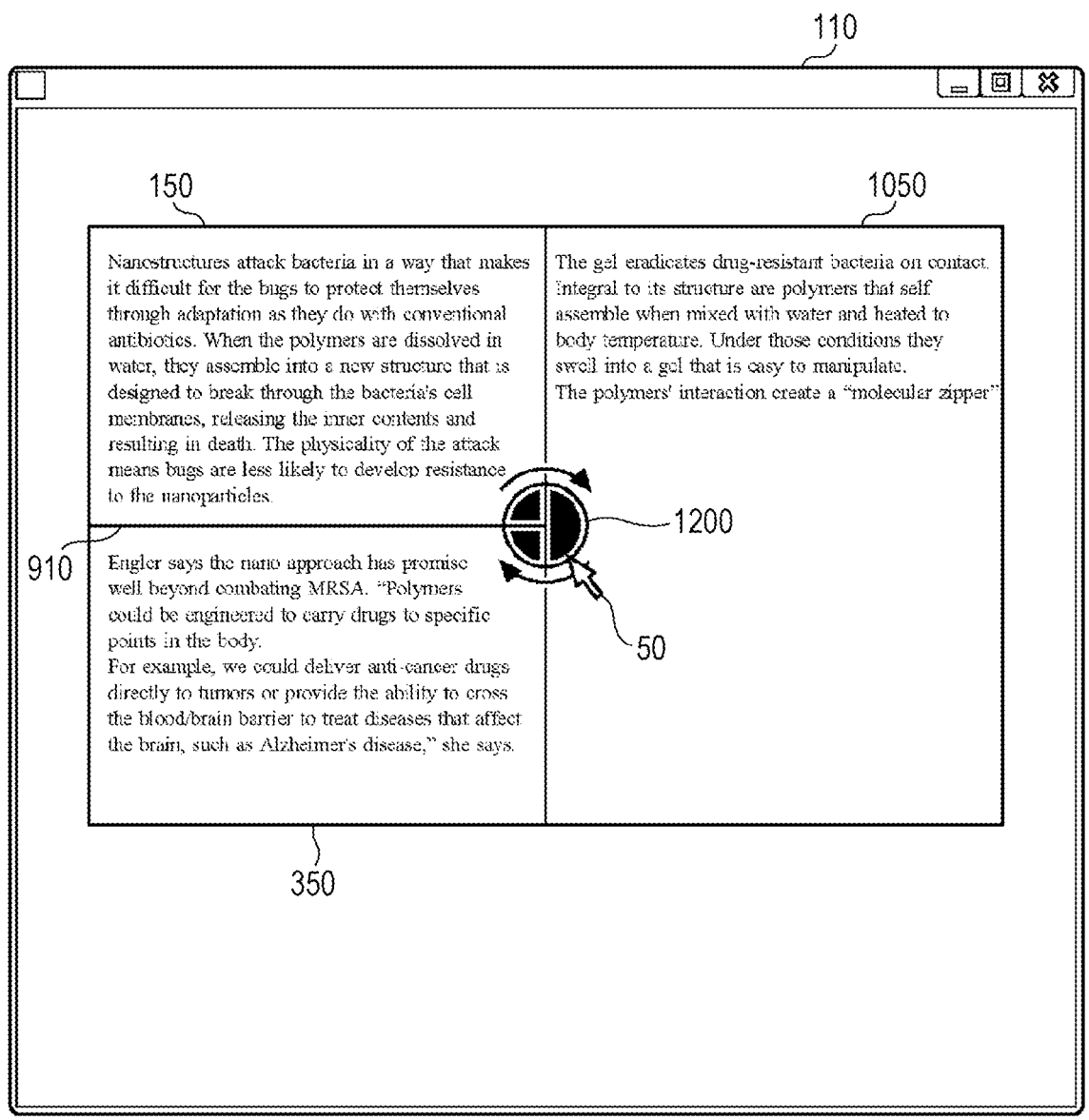
FIG. 12 is a user interface diagram illustrating an operation for changing a joined icon.

FIG. 12 is user interface diagram illustrating an operation for changing a joined icon. In FIG. 12, each of the icons that have been joined together has a fan shape instead of the shape of a puzzle piece in FIG. 11. Thus, each of the icons that have been joined together can have any of various shapes without departing from the essence of the present invention.

In FIG. 12, a joined icon 1200 generated by joining three icons is illustrated. In addition, an area 1050, which is combined so as to correspond to the joining state of the three icons is illustrated. This state is changed to that illustrated in FIG. 13 when an operation for rotating the joined icon 1200 90 degrees in the clockwise direction by using the pointer 50 is performed in this state.

Figure 13:
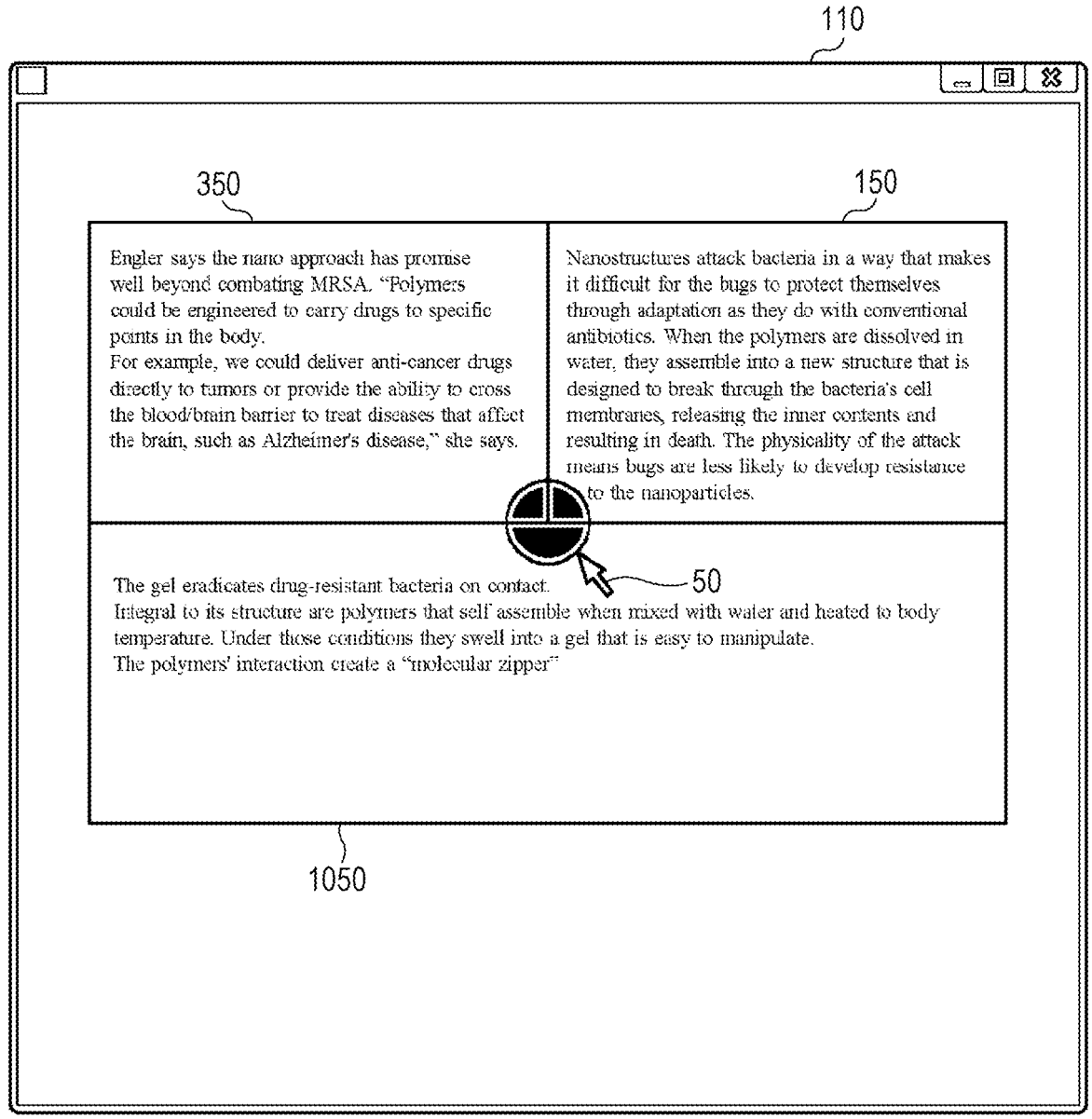
FIG. 13 is a user interface diagram illustrating an operation for rotating the joined icon.

In FIG. 13, the area 1050 is displayed in a rotated manner as a result of the rotation of the joined icon 1200. The content of each area is displayed so as to fit in a corresponding displayed area. Although FIG. 13 illustrates an example of 90-degree clockwise rotation, counterclockwise rotation is also possible. In addition, rotation to any angle is possible when it is not necessary to consider the ease of content viewability. In the case of rotation of 45 degrees, although not illustrated, the combined areas are formed by areas inclined at 45 degrees with respect to the rectangular areas.

Figure 14:
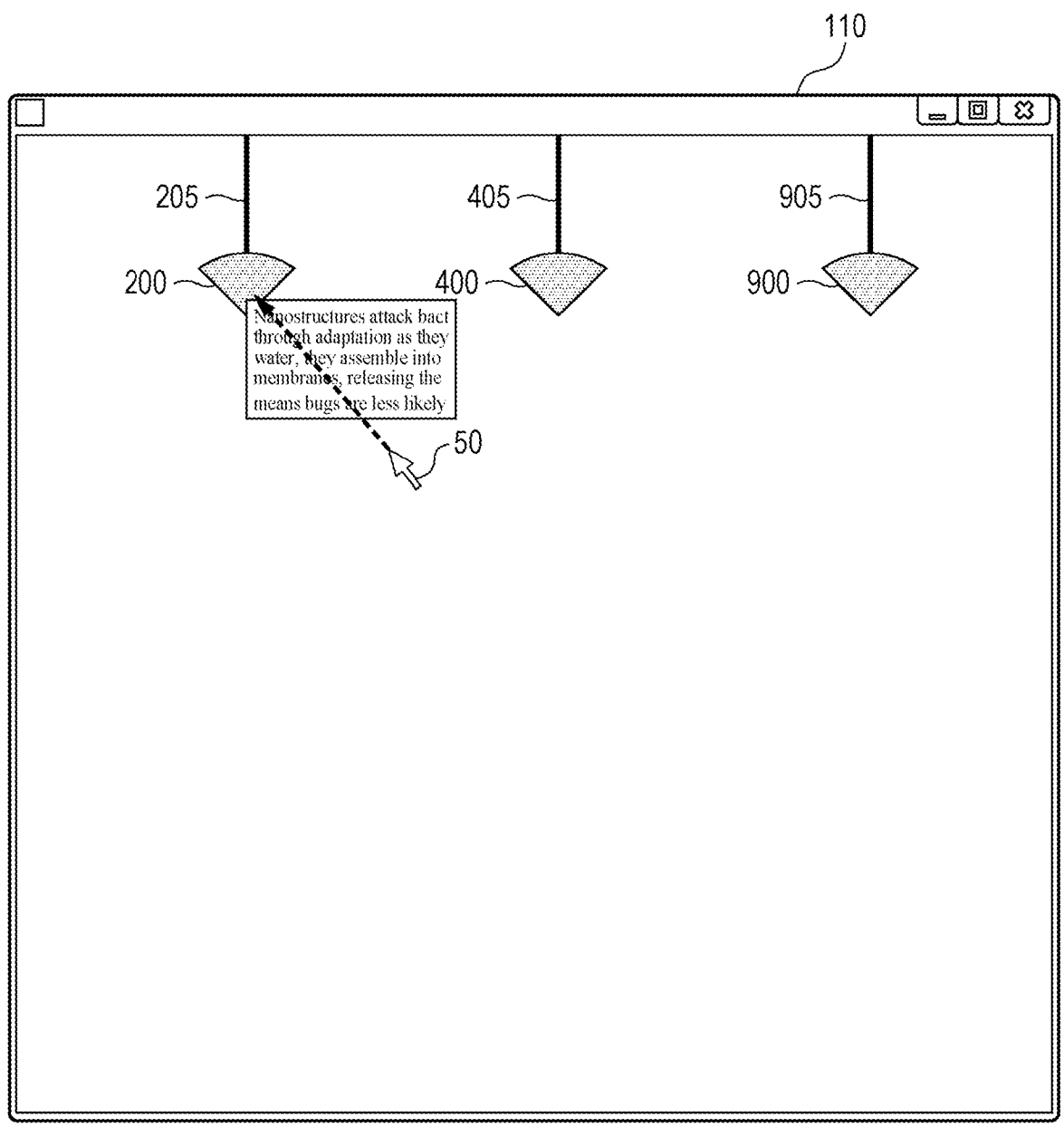
FIG. 14 is a user interface diagram illustrating the area represented by one of the icons in an easy-to-view manner.

FIG. 14 user interface diagram illustrating a method of displaying the area represented by an icon in an easy-to-view manner. FIG. 14 illustrates an example in which fan-shaped icons 200, 400, and 900 are respectively connected, via the connecting lines 205, 405, and 905, to the upper side of the window 110. When the pointer 50 is brought close to the icon 200, the content of the area 150 represented by the icon 200 is displayed near the icon 200.

The content to be displayed near each icon is text selected from the text document in the area at the time of generating the icon. In this way, the areas represented by each icon can be understood instantly.

Figure 15:
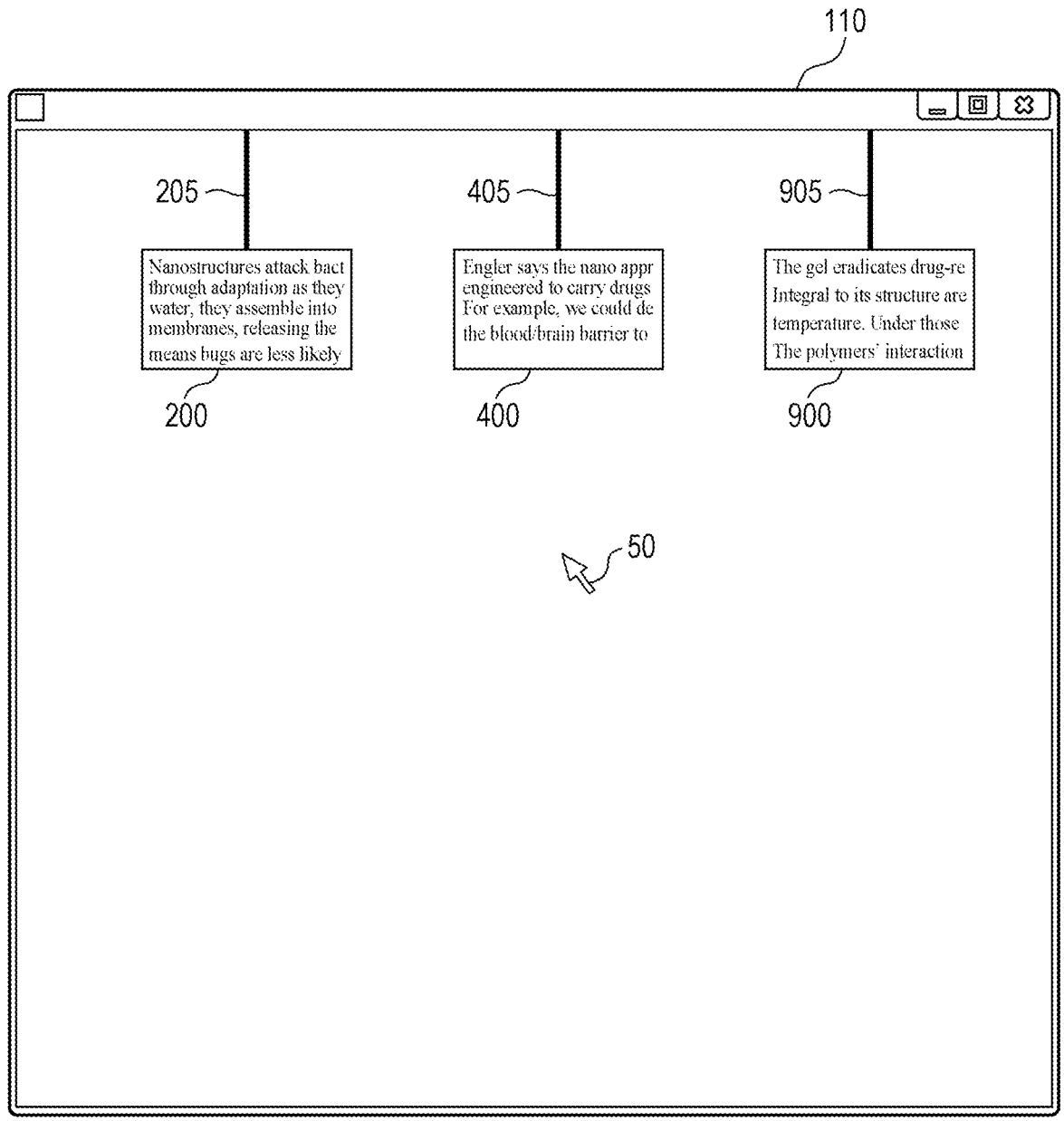
FIG. 15 is a user interface diagram illustrating the area represented by each of the icons in an easy-to-view manner.

FIG. 15 is a user interface diagram illustrating another method of displaying the area represented by an icon in an easy-to-view manner. In FIG. 15, icons 200, 400, and 900 are respectively connected, via the connecting lines 205, 405, and 905, to the upper side of the window 110 as in FIG. 14, and the content of the area represented by each icon is generated and displayed at a reduced size as the icon. This method is more effective when the content is an image than when the content is text.

As another example, when the pointer 50 is hovered above an icon, the text stored at the time of generating the icon may be displayed. Alternatively, a thumbnail of the content in the area may be displayed. Alternatively, a user may be able to input text, and the text may be displayed.

Figure 16:
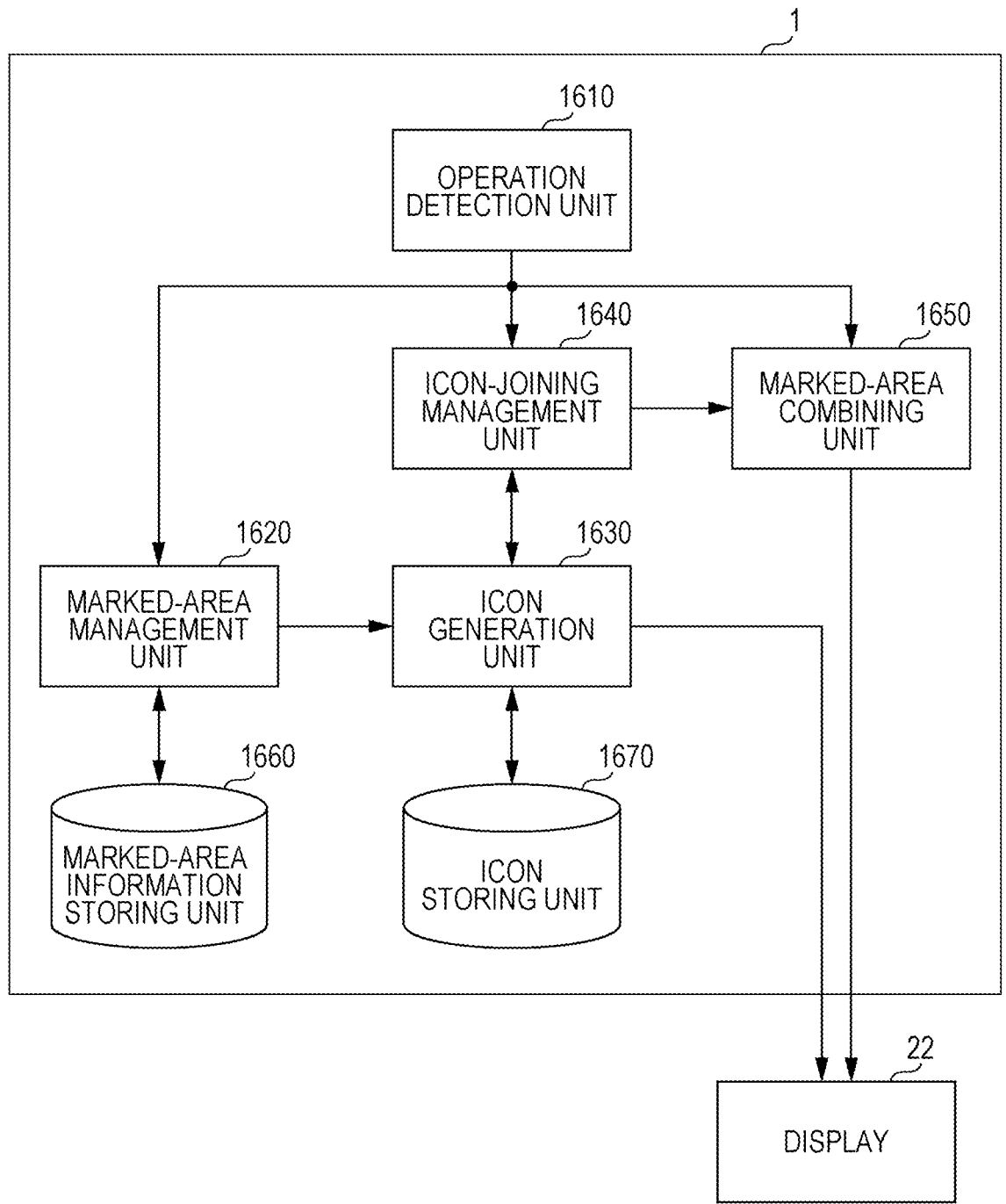
FIG. 16 is a block diagram illustrating an example of a functional configuration of an information processor of an embodiment.

FIG. 16 is a block diagram illustrating an example of a functional configuration of an information processor 1. As illustrated in FIG. 16, the information processor 1 includes an operation detection unit 1610, a marked-area management unit 1620, an icon generation unit 1630, an icon joining management unit 1640, a marked-area combining unit 1650, a marked-area information storing unit 1660, and an icon storing unit 1670.

The operation detection unit 1610 detects whether a user has marked an area. Upon detection of a marked area, the marked-area management unit 1620 stores the information on the marked area in the marked-area information storing unit 1660 and instructs the icon generation unit 1630 to generate an icon. The icon generation unit 1630 generates an icon on the basis of the stored marked-area information, stores the generated icon in the icon storing unit 1670, and instructs the display 22 to display the icon.

In addition, the operation detection unit 1610 detects whether an operation for arranging icons to be in contact with each other has been performed. When icons have been brought into contact with each other, the icon joining management unit 1640 instructs the icon generation unit 1630 to generate a joined icon. The icon generation unit 1630 generates a joined icon based on the contact state of the icons, stores the joined icon in the icon storing unit 1670, and instructs the display 22 to display the joined icon.

As a usage example of a stored joined icon, the joined icon is retrieved by using a specified keystroke combination in order to restore the past display of combined areas.

Upon generation of the joined icon, the icon-joining management unit 1640 instructs the marked-area combining unit 1650 to combine the corresponding areas. The marked-area combining unit 1650 combines the areas according to the joining state of the joined icon and instructs the display 22 to display the combined areas.

Figure 18:
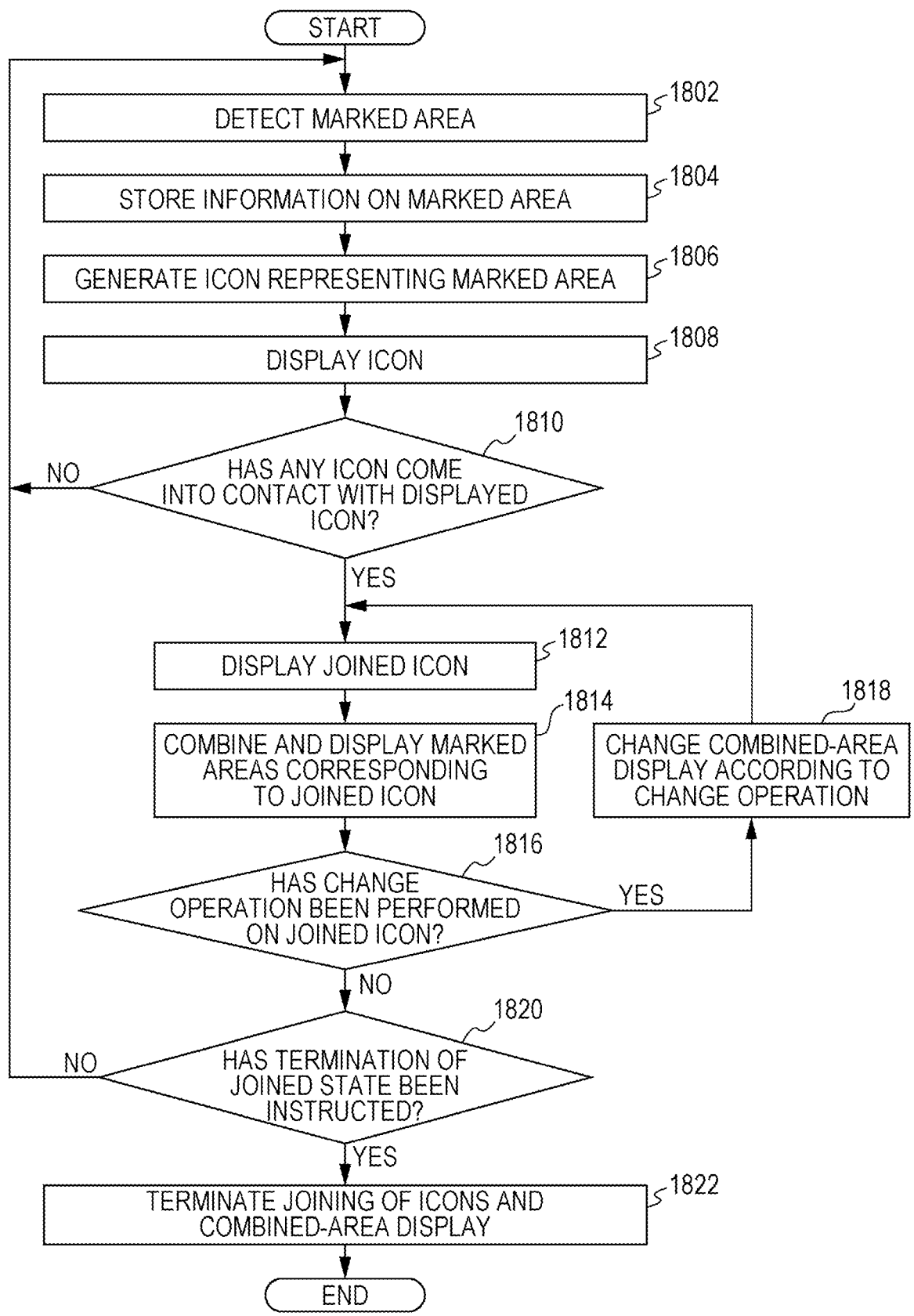
FIG. 18 is a flowchart illustrating an operation example of the present invention.

FIG. 18 is a flowchart illustrating an operation example of the present invention. The operation process is assumed to start at the time when the operation detection unit 1610 has received an instruction to combine areas. This operation process may be started in such a way that an application intercepts an operation performed to specify an area or may be performed in response to an instruction from an agent for monitoring keystroke operation, in a state where the agent has been activated.

When the operation process is started, detection of a marked area is performed in step 1802. When a marked area is detected, information on the marked area is stored in the marked-area information storing unit 1660 in step 1804. Then, in step 1806, an icon representing the marked area is generated.

The icon may be appropriately chosen from multiple predetermined icons or may be automatically generated on the basis of the stored information on the marked area. Then, in step 1808, the generated icon is displayed.

Next, in step 1810, it is determined whether icons have been brought into contact with each other. When no contact is detected, the process returns to step 1802. When contact of icons is detected in step 1810, the icons are displayed in a joined manner in step 1812.

The icons are joined with reference to the contact state, and a joined icon is generated on the basis of the direction in which the icon has been brought into contact with the other. The joined icon is generated on the basis of the shape of the joining-side icon, the information on the area represented by the icon, and the contact state and is displayed.

When the joined icon is generated, the marked areas are combined and displayed in such a manner as to correspond to the joined icon (i.e., to correspond to the contact state) in step 1814.

In step 1816, it is determined whether a change operation has been performed on the joined icon. The change operation is, for example, rotation of the joined icon or deletion of any of the individual icons that have been joined together. When a change operation is detected, changes are made to the joined icon and the combined areas according to the change in step 1818, and the process returns to step 1812.

When no change operation is detected in step 1816, it is determined in step 1820 whether an instruction to terminate the joining has been issued. When no such instruction is detected, the process returns to step 1802.

When an instruction to terminate the joining is detected in step 1820, joining of the icons and displaying of the areas in a combined manner are terminated in step 1822, and the process is terminated. The above-described area-combining process may be terminated at any time by a predetermined keystroke operation.

A number of application examples of the present invention are conceivable without departing from the essence of the present invention. For example, multiple users can browse an information material, an article, a development document, or the like by exchanging stored icons and the information on the corresponding areas between different terminals via the communication interface 1707. In addition, documents of different content types such as an image, an object, and XML, in addition to text, can be combined and displayed without any restrictions, consequently increasing the efficiency of editing work and development work.

The present invention is also applicable to SNSs. In a case where SNS users sharing and following marked areas and joined icons follow an SNS on a sentence-by-sentence basis, it is possible to provide sentences and elements that are attracting particular attention, to the users by using combined areas displayed in an easy-to-view manner. Note that the present invention is not limited to the above-described embodiments. Various changes and improvements are possible within the gist of the present invention.

What is claimed is:

1. A method comprising:
   storing, in response to a user marking an area of a displayed document, information on the marked area;
   displaying an icon representing the marked area;
   conducting the storing operation and the displaying operation for a different area;
   forming, in response to an operation by the user for arranging two or more icons to be in a state of contact with each other, a joined icon by joining the icons together; and
   displaying marked areas, represented by the two or more respective icons, in an orientation corresponding to an orientation of the two or more icons in the state of contact, wherein the joined icon is displayed overlapping the displayed marked areas.

2. The method of claim 1, wherein displaying the icon includes displaying a created icon even when the marked area is moved out of the display area as a result of an operation such as scrolling a display screen.

3. The method of claim 1, wherein displaying the icon includes determining a shape of the icon on the basis of content of the marked area.

4. The method of claim 1, further comprising changing a shape of the icon before and after joining the icon.

5. The method of claim 1, wherein the displaying includes displaying, near the icon, part of the information on an area represented by the icon, displaying the area represented by the icon in a reduced size, as an icon, or displaying any text input by the user.

6. The method of claim 1, wherein the displayed document is one of a plurality of displayed documents, and wherein the marked area displays at least portions of the plurality of displayed documents.

7. The method of claim 1, wherein the two or more respective icons is two icons, and wherein the orientation of the two icons is selected from a group consisting of horizontal and vertical.

8. The method of claim 7, wherein the orientation of the two icons in the state of contact is horizontal and the marked areas represented by the two icons are displayed in a corresponding horizontal orientation with a joining line therebetween.

9. The method of claim 1, further comprising:
after a period of time, displaying the joined icon at a reduced size.

10. The method of claim 1, further comprising:
moving the joined icon to a position that does not overlap with the marked areas.

11. A computer program product comprising:
one or more non-transitory computer-readable recording media and program instructions stored on the one or more non-transitory computer readable recording media, the program instructions executable by a processor to perform a method comprising:
storing, in response to a user marking an area of a displayed document, information on the marked area;
displaying an icon representing the marked area;
conducting the storing operation and the displaying operation for a different area;
forming, in response to an operation by the user for arranging two or more icons to be in a state of contact with each other, a joined icon by joining the icons together; and
displaying marked areas, represented by the two or more respective icons, in an orientation corresponding to an orientation of the two or more icons in the state of contact, wherein the joined icon is displayed overlapping the displayed marked areas.

12. The computer program product according to claim 11, wherein displaying the icon includes displaying a created icon even when the marked area is moved out of the display area as a result of an operation such as scrolling a display screen.

13. The computer program product according to claim 11, wherein displaying the icon includes determining a shape of the icon on the basis of content of the marked area.

14. The computer program product according to claim 11, wherein the method further comprises changing a shape of the icon before and after joining the icon.

15. The computer program product according to claim 11, wherein the displaying includes displaying, near the icon, part of the information on an area represented by the icon, displaying the area represented by the icon in a reduced size, as an icon, or displaying any text input by the user.

16. The computer program product according to claim 11, wherein the displayed document is one of a plurality of displayed documents, and wherein the marked area displays at least portions of the plurality of displayed documents.

17. A computer system comprising:
one or more computers;
one or more computer-readable recording media and program instructions stored on the one or more computer-readable recording media, the system configured to perform a method comprising:
storing, in response to a user marking an area of a displayed document, information on the marked area;
displaying an icon representing the marked area;
conducting the storing operation and the displaying operation for a different area;
forming, in response to an operation by the user for arranging two or more icons to be in a state of contact with each other, a joined icon by joining the icons together; and
displaying marked areas, represented by the two or more respective icons, in an orientation corresponding to an orientation of the two or more icons in the state of contact, wherein the joined icon is displayed overlapping the displayed marked areas.

18. The computer system according to claim 17, wherein displaying the icon includes displaying a created icon even when the marked area is moved out of the display area as a result of an operation such as scrolling a display screen.

19. The computer system according to claim 17, wherein the displaying includes displaying, near the icon, part of the information on an area represented by the icon, displaying the area represented by the icon in a reduced size, as an icon, or displaying any text input by the user.

20. The computer system according to claim 17, wherein the displayed document is one of a plurality of displayed documents, and wherein the marked area displays at least portions of the plurality of displayed documents.

* * * * *